Patented May 19, 1942

2,283,688

UNITED STATES PATENT OFFICE 2,283,688

PROCESS FOR MOLDING COLLOIDAL MATTERS

Paul Louis Mergier and Pierre Edouard Leroy, Paris, France

No Drawing. Application December 19, 1938, Serial No. 246,762. In France December 20, 1937

6 Claims. (Cl. 18—55)

Heretofore the molding of colloidal matters such as cellulose ethers, synthetic resins, etc., has been realized by thermally softening thin sheets, for example, and compressing in appropriate molds.

Another method is also known which consists in compressing under high pressure and heat, powders or grains of the products of the base material which would weld and would then form finished objects. In these two methods, heat, high pressure and very expensive strong molds were required.

Molding hollow objects with dissolved colloidal substances by pouring them into a form and evaporating the solvent could not heretofore be executed on account of the contraction and the deformation of the finished object.

The present invention provides the utilization of a mixture composed of two phases:

(1) A more or less viscous "solution" of a colloidal matter in a volatile solvent;

(2) Grains which are in a state of incipient dissolution by the solvent of the above mentioned solution; these grains of a ponderable size may be composed either of the same colloid which is dissolved in the base solution or of any other colloid (especially polymerisable ones) soluble in the solvent of the solution.

This mixture is poured into the molds; the liquid part turns quickly into a gel, and this is due to the presence of imperfectly dissolved grains, without producing the syneresis phenomenon (contraction with expulsion of solvent).

The drying is very even and the finished objects reproduce exactly the shape of the mold.

The molds may be made of plaster or any other suitable matter, and to avoid the adhesion of the molded matter they can be internally coated with a thin aqueous gelatinous solution. Different colloids may be incorporated to provide the matter dissolved in the same mixture. Thus cellulose ethers more or less degraded and synthetic products obtained by polymerisation can be utilized to that effect.

Some other non-soluble products can, of course, be incorporated to the mixture as fillers.

*Example.*—10 kg. of cellulose acetate are dissolved (at the ambient temperature) in 30 kg. of acetone and to the viscous solution thus obtained is added powder or dry grains of cellulose acetate. The mixture is poured in a plaster mold preliminarily coated with a solution giving after drying an insulated layer to avoid adhesion of the matter to the mold and for example with a gelatinous aqueous solution. According to the nature and the characteristics of the product which is desired to be obtained the mixture is left at rest from 3 to 72 hours.

The method of the present invention thus makes it possible to obtain an easy molding, in cheap molds, as those in plaster for example, of pieces of all dimensions, transparent, translucent or opaque, colored or not according to the incorporated fillers, such as statues, fancy goods, household furnitures, canoes, lighting apparatus, advertising objects, luminous sign boards, architectural elements, etc.; the process is applicable in particular for the fabrication of hollow objects.

The matter itself can be applied for lining of objects (walls for example) to which it gives a different attractive aspect.

What we claim is:

1. The process of producing molded articles which comprises making a mixture of a viscous solution of a colloid in a volatile solvent and a sufficient amount of a solid granular colloid soluble in said solvent to harden the mixture by absorption of the solvent by said granular colloid, pouring the mixture into a mold while the mixture is still fluid, letting the mixture remain in the mold for a sufficient time to permit hardening of the mixture by the absorption of solvent by the granular colloid and removing the molded article from the mold.

2. The process of producing molded articles which comprises making a mixture of a viscous solution of a colloid in a volatile solvent and a sufficient proportion of grains of ponderable size of a solid colloid soluble in said solvent to harden the mixture by absorption of the solvent by said grains of colloid, pouring the mixture into a mold while the mixture is still fluid, causing the mixture to form a gel by the absorption of solvent by the granular colloid, further drying the product and removing the molded article from the mold.

3. The process of producing a molded article which comprises making a viscous solution of cellulose acetate in acetone, adding dry grains of cellulose acetate to the solution to form a fluid mixture containing grains of cellulose acetate sufficient in quantity to cause hardening of the mixture by absorption of the acetone by the grains of cellulose acetate, pouring the mixture into a plaster mold while still fluid, permitting the mixture to harden by absorption of acetone by the grains of cellulose acetate and removing the hardened product from the mold.

4. The process defined in claim 1, the colloidal material being cellulose ether.

5. The process defined in claim 1, the colloidal material being cellulose ester.

6. The process defined in claim 1, the colloidal material being cellulose acetate.

PAUL LOUIS MERGIER.
PIERRE EDOUARD LEROY.